United States Patent
Heiney et al.

(10) Patent No.: US 9,501,457 B2
(45) Date of Patent: Nov. 22, 2016

(54) CREATING A COMMUNICATION EDITABLE IN A BROWSER INDEPENDENT OF PLATFORM AND OPERATING SYSTEM

(71) Applicant: AirSpring Software, LLC, Lexington, KY (US)

(72) Inventors: Ron L. Heiney, Lexington, KY (US); Robert C. Guckenberger, Lexington, KY (US)

(73) Assignee: AIRSPRING SOFTWARE, LLC, Lexington, KY (US)

( * ) Notice: Subject to any disclaimer, the term of this patent is extended or adjusted under 35 U.S.C. 154(b) by 500 days.

(21) Appl. No.: 14/039,608

(22) Filed: Sep. 27, 2013

(65) Prior Publication Data
US 2014/0310589 A1    Oct. 16, 2014

Related U.S. Application Data

(60) Provisional application No. 61/759,650, filed on Feb. 1, 2013.

(51) Int. Cl.
*G06F 17/22* (2006.01)
*G06F 17/24* (2006.01)
*G06F 17/30* (2006.01)

(52) U.S. Cl.
CPC ........... *G06F 17/2247* (2013.01); *G06F 17/24* (2013.01); *G06F 17/30861* (2013.01)

(58) Field of Classification Search
None
See application file for complete search history.

(56) References Cited

U.S. PATENT DOCUMENTS

| | | | |
|---|---|---|---|
| 8,225,197 B1 | 7/2012 | Szewczyk | |
| 8,286,076 B1 | 10/2012 | Szewczyk | |
| 2011/0252303 A1* | 10/2011 | Lemonik | G06F 17/218 715/234 |
| 2012/0266061 A1 | 10/2012 | Williamson et al. | |

OTHER PUBLICATIONS

Almaer, Dion; "Introducing Bespin"; Feb. 12, 2009; Vimeo.com; https://vimeo.com/3195079.*

(Continued)

*Primary Examiner* — Asher Kells
(74) *Attorney, Agent, or Firm* — King & Schickli, PLLC

(57) ABSTRACT

Methods, systems, and apparatuses, including computer programs encoded on a computer storage medium, for creating a communication including content editable in a browser independent of platform or operating system. A system creates such a communication by defining the communication in markup language having a plurality of elements, adding canvas element(s) as one of the elements, inserting script within the markup language for defining the user specific and non-user specific content as a plurality of user specific and non-user specific objects, establishing coordinates for each of the user specific and non-user specific objects relative a defined origin, drawing each object at the coordinates established for the object in the canvas element(s) as canvas natives visible in the browser, and interpreting user initiated events for use in editing at least one of the plurality of user specific objects and the plurality of non-user specific objects.

31 Claims, 4 Drawing Sheets

(56) References Cited

OTHER PUBLICATIONS

Galbraith, Ben; "Bespin and Canvas: Part 1"; Feb. 17, 2009; Ben Galbraith's Blog; http://blog.bengalbraith.com/2009/02/17/bespin-and-canvas/.*

Galbraith, Ben; "Bespin and Canvas: Part 2"; Feb. 18, 2009; Ben Galbraith's Blog; http://blog.bengalbraith.com/2009/02/18/bespin-and-canvas-part-2/.*

* cited by examiner

CREATING A COMMUNICATION EDITABLE IN A BROWSER INDEPENDENT OF PLATFORM AND OPERATING SYSTEM

This application claims the benefit of U.S. Provisional Patent Application No. 61/759,650, filed Feb. 1, 2013, the disclosure of which is incorporated herein by reference.

FIELD OF THE INVENTION

The present invention relates generally to communications which include content editable in a browser independent of platform or operating system.

BACKGROUND OF THE INVENTION

Businesses communicate with customers, employees, partners and others through various routine and ad hoc document based communications. A non-exhaustive list of examples of such communications includes monthly statements, bills, and invoices; semi-annual or annual documents such as policies or shareholder reports; and, business activity related communications such as letters, contracts, and proposals.

These document based communications typically require personalization through the inclusion of data, in varying forms, from or about the communication recipient. The inclusion of customer or user specific data, such as customer billing data, credit card transactions, or bank credits/debits, requires the communications to be dynamic in their layout to accommodate substantial variability. For example, one customer recipient may have a dozen credit card transactions whereas another may have hundreds. Even more, such data may need to be in tabular, graphical and/or chart formats for improved readability. In final form, each recipient's communication is personalized because the user specific data associated with their respective accounts, transactions, policies or the like are unique to them.

Other business activity related communications may require business users to edit partially composed communications in order to finalize them for recipient consumption. A system generated communication for an insurance claim status, for instance, may require an in-house claims representative to select or update certain user specific information based on input from an insurance agent or a police report. In some instances, business rules may dictate that only certain portions, sections, or text in a communication can be changed based on the editor's role in or relationship with the organization. Regardless of the type of data found in such communications, variable substitution in business communications is commonly required.

Such communications are presently created with desktop word processing software or software solutions known as variable data publishing or VDP. Regardless of the method used, each of the current approaches requires software installation on a creator's personal computer or on a central server that provides a virtualized emulation of such a local installation. The publishing software is required to design the layout or format of the communication inclusive of what information to display, data formats, text, images, charts, etc. Additionally, as different printer manufacturers and communication display software programs or applications each have their own proprietary format the publishing software must also describe the print or electronic output language of the communication.

As the publishing software is enhanced with new functionality it must be tested and subsequently redistributed to users. In a business environment, an information technology (IT) group typically manages software updates for company users. Or, as with non-employees and consumers, users are required to download and install new software versions when made available. The inherent issues with this approach include a high cost of communicating and scheduling changes, making the updates, troubleshooting individual technical issues due to unique configurations, and lost productivity of business users and consumers as they deal with the disruptions and costs associated with the software update process.

Despite the predominance of distributed, desktop software, business user's and application developer's preferences are moving toward using browser-based solutions to perform their job functions. In addition to eliminating the need for local software installation, browser-based solutions enable users to work from any location from a variety of devices. Corporate information technology departments prefer browser-based software as well due to the inherent costs associated with maintaining user desktop computers and required software.

In addition to browser-based solutions, business employees and customers alike are increasingly adopting and using their mobile devices, such as smartphones and tablets, to engage with each other and businesses. Therefore, businesses are beginning to create custom applications to interact with their employees and customers in this manner.

Current approaches to develop communications destined for smartphones and tablets bring an additional set of disadvantages. Because there is no single standard with respect to form factor such as screen size, operating system, web browser capabilities, or programming language support, companies are required to either develop their mobile applications and websites with consideration for each device nuance (and test and maintain those systems) or select a subset of devices to support. Developing programs for each device type is high cost in both initial development and ongoing maintenance. The subset approach risks customer dissatisfaction in the event a given customer's preferred device is not supported.

Despite these disadvantages, there are now applications that support limited browser-based creating and editing of communications. These solutions rely on hypertext markup language, or HTML, controls and other third party rendering controls that each has certain shortcomings. For example, the resultant communication layout as viewed by a user in the browser session is unlikely to match the final printed or displayed communication. This undesired result is due to limitations in rendering in browser controls that do not provide for strict fidelity between the browser and the printer or display software. The browser rendering mechanism, such as an HTML control, does not automatically take output device characteristics into consideration when displaying information. Even more, the rendering mechanisms do not enable user control of embedded images or other content with pixel level placement. The rendering mechanisms also do not provide for the explicit layout of content, such as text wrapping, flow of content on single pages or flow across multiple pages.

Accordingly, a method of creating a communication including user specific content editable in a browser by a user that is independent of the user's platform or operating system is needed. Preferably, the method would provide for the design, presentment and interactive editing of communications in a browser environment without desktop software, plug-ins or virtualized environment. All of these features are provided by the following invention.

SUMMARY OF THE INVENTION

The present invention meets these needs by providing methods, systems, and apparatuses, including computer programs encoded on a computer storage medium, for creating a communication including user specific content editable in a browser by a user that is independent of the user's platform or operating system.

In accordance with a first aspect of the invention, a computer-implemented method is disclosed. The method includes the steps of defining a communication in markup language supported by the browser including a plurality of elements, adding at least one canvas element as one of the plurality of elements, and inserting script within the markup language for (1) defining the user specific content as a plurality of user specific objects, (2) defining non-user specific content as a plurality of non-user specific objects, (3) establishing coordinates for each of the plurality of user specific objects and non-user specific objects relative a defined origin, (4) drawing each user specific object and non-user specific object at the coordinates established for the user specific object or non-user specific object in the at least one canvas element as canvas natives visible in the browser, and (5) interpreting user initiated events for use in editing at least one of the plurality of user specific objects and the plurality of non-user specific objects.

The script inserted within the markup language may also include script for further defining each of the plurality of user specific objects and non-user specific objects to include a pointer for each object associated therewith whether the associated object is a user or non-user specific object, script for further defining each of the plurality of user specific objects and non-user specific objects to include at least one informational pointer, script for re-establishing coordinates for each object of the plurality of user specific objects and non-user specific objects associated with an object that has been edited as the result of an interpreted user initiated event, script for redefining the pointer for each object of the plurality of user specific objects and non-user specific objects associated with an object that has been edited as the result of the interpreted user initiated event, and/or script for redrawing each object having re-established coordinates in the at least one canvas element as canvas natives visible in the browser.

The plurality of non-user specific objects in the computer-implemented method may include a cursor object having coordinates relative to the defined origin, and the plurality of elements defining the communication in markup language supported by the browser may be styled using cascading style sheets. The script inserted within the markup language may also include script for formatting the drawing commands in accordance with the cascading style sheets used to style the plurality of elements.

In accordance with another aspect of the invention, a computer storage medium encoded with a computer program is disclosed. The program includes instructions that when executed by one or more computers cause one or more computers to perform operations including defining a communication, including user specific content editable in a browser by a user independent of the user's platform or operating system, in markup language supported by the browser including a plurality of elements, adding at least one canvas element as one of the plurality of elements, and inserting script within the markup language for (1) defining the user specific content as a plurality of user specific objects, (2) defining non-user specific content as a plurality of non-user specific objects, (3) establishing coordinates for each of the plurality of user specific objects and non-user specific objects relative a defined origin, (4) drawing each user specific object and non-user specific object at the coordinates established for the user specific object or non-user specific object in the at least one canvas element as canvas natives visible in the browser, and (5) interpreting user initiated events for use in editing at least one of the plurality of user specific objects and the plurality of non-user specific objects.

The computer program may also include instructions that when executed by one or more computers cause one or more computers to perform operations including inserting script for further defining each of the plurality of user specific objects and non-user specific objects to include a pointer for each object associated therewith whether the associated object is a user or non-user specific object, inserting script for further defining each of the plurality of user specific objects and non-user specific objects to include at least one informational pointer, inserting script for re-establishing coordinates for each object of the plurality of user specific objects and non-user specific objects associated with an object that has been edited as the result of an interpreted user initiated event, inserting script for redefining the pointer for each object of the plurality of user specific objects and non-user specific objects associated with an object that has been edited as the result of the interpreted user initiated event, and/or inserting script for redrawing each object having re-established coordinates in the at least one canvas element as canvas natives visible in the browser.

The plurality of non-user specific objects in the computer storage medium encoded with a computer program may include a cursor object having coordinates relative to the defined origin, and the plurality of elements defining the communication in markup language supported by the browser may be styled using cascading style sheets. The script inserted within the markup language may also include script for formatting the drawing commands in accordance with the cascading style sheets used to style the plurality of elements.

In accordance with another aspect of the invention, a system comprising one or more computers is disclosed. A computer-readable medium may be coupled to the one or more computers and have instructions stored thereon which, when executed by the one or more computers, cause the one or more computers to perform operations including defining a communication, including user specific content editable in a browser by a user independent of the user's platform or operating system, in markup language supported by the browser including a plurality of elements, adding at least one canvas element as one of the plurality of elements, and inserting script within the markup language for (1) defining the user specific content as a plurality of user specific objects, (2) defining non-user specific content as a plurality of non-user specific objects, (3) establishing coordinates for each of the plurality of user specific objects and non-user specific objects relative a defined origin, (4) drawing each user specific object and non-user specific object at the coordinates established for the user specific object or non-user specific object in the at least one canvas element as canvas natives visible in the browser, and (5) interpreting user initiated events for use in editing at least one of the plurality of user specific objects and the plurality of non-user specific objects.

The instructions stored on the computer-readable medium coupled to the one or more computers, when executed by the one or more computers, may also cause the one or more computers to perform operations including inserting script for further defining each of the plurality of user specific objects and non-user specific objects to include a pointer for each object associated therewith whether the associated object is a user or non-user specific object, inserting script for further defining each of the plurality of user specific objects and non-user specific objects to include at least one informational pointer, inserting script for re-establishing coordinates for each object of the plurality of user specific objects and non-user specific objects associated with an object that has been edited as the result of an interpreted user initiated event, inserting script for redefining the pointer for each object of the plurality of user specific objects and non-user specific objects associated with an object that has been edited as the result of the interpreted user initiated event, and/or inserting script for redrawing each object having re-established coordinates in the at least one canvas element as canvas natives visible in the browser.

The plurality of non-user specific objects may include a cursor object having coordinates relative to the defined origin, and the plurality of elements defining the communication in markup language supported by the browser may be styled using cascading style sheets. The script inserted within the markup language may also include script for formatting the drawing commands in accordance with the cascading style sheets used to style the plurality of elements.

The Summary and Abstract sections may set forth one or more but not all exemplary embodiments of the present invention as contemplated by the inventor(s), and thus, are not intended to limit the present invention and the appended claims in any way.

Other embodiments may include corresponding systems, apparatus, and computer programs, configured to perform the actions of the methods, encoded on computer storage devices. These and other embodiments of the invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification illustrate several aspects of the invention and, together with the description, assist in explaining the principles of the invention. In the drawings.

Figure 1:
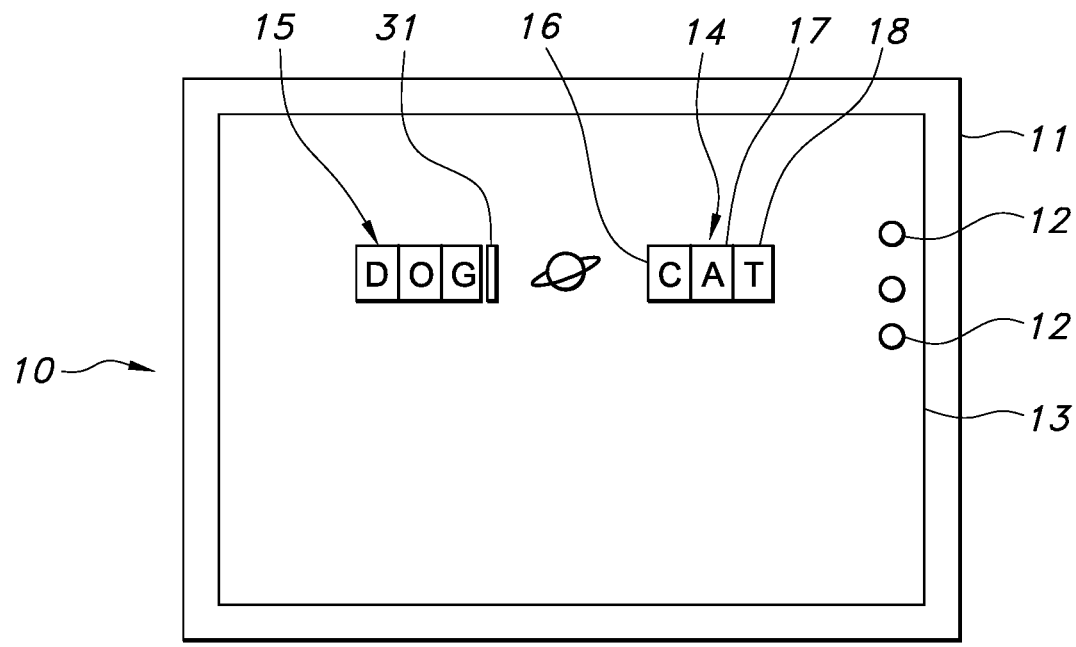
FIG. 1 illustrates a canvas element used to display content of a communication in a text area.

Reference will now be made in detail to the present preferred embodiment of the invention, an example of which is illustrated in the accompanying drawings.

DETAILED DESCRIPTION OF THE PREFERRED EMBODIMENT

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the invention, methods, systems, and apparatuses, including computer programs encoded on a computer storage medium, are hereinafter described for use in creating a communication including user specific content editable in a browser by a user independent of the user's platform or operating system.

The term communication is broadly defined as an exchange of thoughts, messages, or information, as by speech, visuals, signals, writing, or behavior. With regard to the present invention, a communication is a computer file containing electronic media content such as a business document, a website, a webpage, a software application including mobile applications, or any other means of exchanging content. Such communications are viewable by users of computers, such as laptops, desktops or tablet computers, or through mobile devices, smartphones, or other like platforms utilizing a browser. In accordance with the present invention, the communication may be edited in the browser of a platform without requiring the browser user to download or install additional code for capabilities that may not already be supported by the user's browser. This is the case regardless of the user's platform or operating system.

Generally speaking, a browser retrieves a communication from a server and displays the communication to a user. The communication is typically a computer file written or defined in a markup language, such as hyper-text markup language, or HTML, that may have text, graphic images, and even multimedia objects, such as audio or video recordings, among others that are associated with the file. As is well known by those skilled in the field, HTML is composed of HTML elements. Each element can have HTML attributes specified. Elements can also have content, including other elements and text, for example. HTML elements represent semantics, or meaning. For example, the "title" element represents the title of the communication.

A communication defined in markup language further includes control tags and data. The control tags identify the structure: for example, the headings, subheadings, paragraphs, lists, and embedding of images. The data consists of the content, such as text, images, multimedia, and the like, which are displayed or played to the user. In a business communication, for example, some of the content may be common to each communication of a particular type of communication (e.g., an invoice) while other portions of the content may be specific to an intended recipient or user. The user specific content could include, for example, a name, address, account number, a listing of charges and/or any additional information specific to the user. The common or non-user specific content could include, for example, a header, color scheme, trademarks, logos, and/or the overall look or layout of the communication.

Upon receiving such a communication, the browser interprets the control tags and formats the data according to the structure specified by the control tags to create a viewable object that the browser displays, plays or otherwise performs to the user. A control tag may direct the browser to retrieve a page from another source and place it at the location specified by the control tag. In this way, the browser can build a viewable object that contains multiple components, such as text, images, hotlinks, sound, spreadsheets, and/or video objects that is then displayed within a graphical user interface. Browsers can also refer to Cascading Style Sheets (CSS) to define the appearance and layout of text and other content.

HTML is the most common markup language for creating communications to be displayed in browsers. As generally indicated above, HTML is written in the form of HTML elements consisting of tags which most commonly come in pairs like <h1> and </h1>, although some tags represent empty elements and so are unpaired, for example <img>. The first tag in a pair is the start tag, and the second tag is the end tag. In between these tags, communication designers can add text, further tags, comments and other types of text-based content. HTML provides a means for creating communications by denoting structural semantics for text such as headings, paragraphs, lists, links, quotes and other items. HTML can also embed or insert scripts within the markup language which affect the behavior of HTML communications.

The HTML 5 markup language includes a canvas element that allows for dynamic, scriptable rendering of two dimensional shapes and bitmap images. The canvas element, or canvas, is a low level element that consists of a drawable region defined in HTML with height and width attributes. Applications using canvas use script (e.g., JavaScript®) to control the generation and interaction with the graphics or text placed in the canvas. Currently, canvas is supported by at least the current versions of Google® Chrome™, Safari®, Mozilla®, Firefox®, Internet Explorer™, Konqueror™, and Opera®. Older versions of Internet Explorer™, version 8 and earlier do not support canvas, however, Google® and Mozilla® plugins are available.

Additional browsers including those known now, or developed in the future, will likewise support HTML 5 and other markup languages which provide an element that allows for dynamic, scriptable rendering of two dimensional shapes and bitmap images such as the canvas element. The current invention, therefore, is not limited to the HTML 5 markup language or to existing browsers which support canvas but can be implemented in any communication written in a markup language that supports an element that allows for dynamic, scriptable rendering of two dimensional shapes and bitmap images.

In the present invention, a communication 10 (shown generally in FIG. 1) is created by defining the communication in a markup language supported by a browser 11 as a plurality of elements. The plurality of elements, in the present embodiment, may include ubiquitous HTML 5 components with a fixed purpose, for example, a check box, radio buttons 12, a text field, etc., or images, and containers, and additional markup language elements. Each of these elements may be styled using CSS as is well known in the art.

At least one of the plurality of elements defining the communication 10 is a canvas element. The canvas element, or canvas, is used to display the content of the communication in a text area 13 as shown in FIG. 1. The content may include both user specific content and non-user specific content including, for example, text, images, and other content, and a cursor, visual indicators (e.g., a red line beneath and indicating spelling errors), highlighting, underlining, and like items to be displayed in the text area 13 which mimic a word processing environment. Anything used in a communication may be included as content in accordance with the present invention.

To accomplish the drawing or display of the content, script is inserted within the markup language to control the generation of and interaction with the content placed in the canvas or text area 13. In other words, the script forms an invisible client that controls the content, intercepts all user interactions with the content in the browser 11 (e.g., hover, move, click, keystrokes, paste, etc.), and alters the content as displayed in the text area 13 accordingly. In the present embodiment, JavaScript® script is used for this purpose.

More specifically, the script defines the user specific content as a plurality of user specific objects and the non-user specific content as a plurality of non-user specific objects, and establishes coordinates for each of the plurality of user specific objects and non-user specific objects relative a defined origin of the text area 13. The text area 13 is itself defined as an object that includes the user specific objects and non-user specific objects. The inserted script further draws each user specific object and non-user specific object at the coordinates established for the user specific object or non-user specific object in the text area 13 as canvas natives visible in the browser 11. This assumes a context and is open ended vis-à-vis available commands in the context application programming interface or API. As is known in the art, an API specifies how some software components should interact with each other.

As further shown in FIG. 1, radio buttons 12 are representative of non-user specific content and the words "CAT" and "DOG" are representative of user specific content. More specifically, the character "C" in the word "CAT" may be defined as a first object 16. The word "CAT" may likewise be defined as a second object 14 that includes the first object 16 along with the characters "A" and "T" which themselves are defined as objects 17, 18. Essentially, each character, data element, and embedded image, etc. which makeup the content of the communication 10 is defined as an object. These objects may be grouped together as words, numbers, formulas, or other combinations of objects. Generally speaking, a character is one piece of text (e.g., each letter of the alphabet in English or a numeral), and a data element is a reference to a piece of variable data in a data source such as a database that is being rendered as one or more characters of text such that a group of characters could belong to a single data element. Even more, these objects may be embedded at many levels. For example, a panel can be embedded in a text area, a second text area inside of the panel, a second panel inside of the second text area, or an image inside of the second panel, and so on. The panel may be a container or area on a page that holds other objects such as text, images, or even other panels or sub-containers. These examples are merely for illustration of the flexibility of the invention and the user can create the communication with embedded objects of any nature as required for its intended purpose in accordance with the invention.

The script inserted within the markup language forming the invisible client further defines each of the objects to include a pointer P for each object associated therewith. This is the case whether the associated object is a user or non-user specific object. As more generally noted above, some objects may include static text while other objects may represent a composite of text, images, and/or data from external sources such as files, databases, or other displayed objects like input fields in the communication presented in the browser. Even more, user specific objects or non-user specific objects may have at least one informational pointer to, for example, reference a style of text (bold, italic, etc.), hyperlinks, or other information relating to the object or portions of the object in the case of a composite object.

Figure 2:
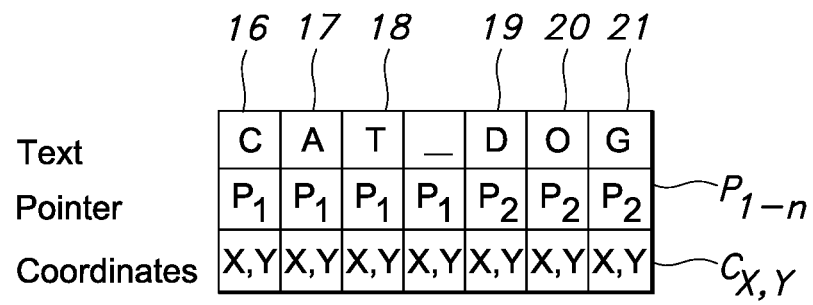
FIG. 2 illustrates an association of character objects with coordinates and pointers.

As is generally shown in FIG. 2, each object has its x, y coordinates ($C_{x, y}$) and a pointer ($P_{1-n}$) to other objects the editing of which may affect the original object during editing of the communication. For example, the letter "T" object 18 may have a pointer $P_1$ to the word "CAT" object 14. Likewise, the letter "C" and "A" objects 16, 17 would have pointers $P_1$ to the word "CAT" object 14. In this manner, if the word "CAT" object 14 is edited by a user, the coordinates of the associated letter objects could be easily re-established for use in redrawing the text area object 13. Similarly, letter objects "D", "O", and "G" (represented by numerals 19-21 respectively) would have pointers $P_2$ and the word "DOG" object 15 would have a pointer to the word "CAT" object 14 as an associated object given its adjacent location. Word objects may likewise be associated with sentence objects and/or paragraph or page objects in accordance with the present invention. In its broadest sense, any object could be associated with any other object that may affect the original object during editing of the communication.

For this reason, an object typically has a series or group of pointers ($P_1, P_2 \ldots P_n$) which provide specific information such as word objects or paragraph objects an object is associated with, or other information (e.g., a specific style for the object). Each of the letter "C", "A", and "T" objects 16, 17, and 18, and the word "CAT" object 14 may, for example, have additional pointers to the word "DOG" object 15 as noted above or a sentence or a paragraph (not shown) within which they are contained.

As noted, pointers may be used to associate objects with a style equivalent to a CSS to allow standard markup language formatting to be applied so that the canvas and non-canvas elements within the communication have the same look and feel. This is accomplished through insertion of script within the markup language for formatting the drawing commands in accordance with the cascading style sheets used to style the plurality of elements defining the communication. In other words, the invisible client receives CSS commands, parses the commands, and formats the drawing commands that are sent to the text area 13 to display the objects. Additional pointers may be used to associate objects with linking information, variable information, or embedded information or the like. In this manner, the script defines each object in a highly intelligent manner and with only the position of the user action (e.g., click of a mouse or keystroke), editing can be performed on the content of the communication 10.

As noted generally above, the script forms an invisible client that broadly speaking controls the content, intercepts all user interactions with the content in the browser 11, and alters the content as displayed in the text area 13. More specifically, the script interprets the user initiated events for use in editing at least one of the plurality of user specific objects and the plurality of non-user specific objects. When a user edits the content of the communication 10 in the browser 11, at least some of the remaining and/or altered content must be reflowed and redrawn in the browser as amended.

To assure desired performance when redrawing content in the browser 11 after editing, clipping is applied so that only affected portions of content are reflowed and redrawn when the user is interacting with the communication 10. For example, when a multi-page communication is edited, preferably no more than the page currently being displayed is reflowed unless the user navigates to a different page of the communication 10. For instance, only a rectangular area holding lines containing objects that changed position may be reflowed and redrawn. In this manner, the objects of the text area 13 can draw themselves asynchronously while the user is interacting with the communication 10.

The objects, the user specific objects and non-user specific objects, and their associated pointers are stored in a memory (e.g., primary memory 403 or secondary memory 404 as later shown and described in FIG. 5). The memory within which the objects are stored may be in the platform 101, the server 103, or both. Further, only portions of the objects may be stored in the platform 101, the server 103, or both.

For example, the server 103 may maintain a subset of objects in the memory. This subset of objects may be updated when an object has been edited in the browser 102 as the result of an interpreted user initiated event on the platform 101, and may only include objects that may be edited as the result of an interpreted user initiated event. The platform 101, on the other hand, may maintain a superset of objects in the platform memory. The superset of objects may include the subset of objects stored in memory at the server 103 and any other objects representing content drawn in the browser 102. The superset of objects are stored in the memory on the platform 101 and are updated directly as the user interacts with the communication. In the present embodiment, the superset of objects is not sent to the server 103. Rather, only objects edited as the result of an interpreted user initiated events are communicated to the server 103 for updating the subset of objects of the communication.

To further assure desired performance when redrawing content in the browser 11, the resolution of the text area 13 may be required to be increased as the browser zooms in on a selected portion of the text area since the text area (canvas) renders as an image (raster format) in the browser. As noted above, script is inserted within the markup language to control the generation of the content placed in the canvas or text area. This script may be used to accommodate zooming by changing the resolution of the canvas based on a selected zoom setting.

The script effectively simulates what a vector-based HTML control would do resulting in smooth detailed content at any zoom level. As is known in the art, HTML controls are rendered in a vector (line) format whereas canvas is rendered in a raster (image) format. When a user zooms using HTML controls (e.g., in a PDF or a Word document) the content gets larger, sharper, and more finely detailed. In the case of canvas, however, the content gets larger but not sharper. In a raster format, the image is formed by discrete pixels which are a fixed size (a percentage of the size of the image), so when a user zooms, no additional information is provided unlike the vector format which is re-rendered. Thus, increasing the resolution in this manner is desired to avoid jagged and/or blurry content which is a deficiency in many existing canvas applications.

Figure 3:
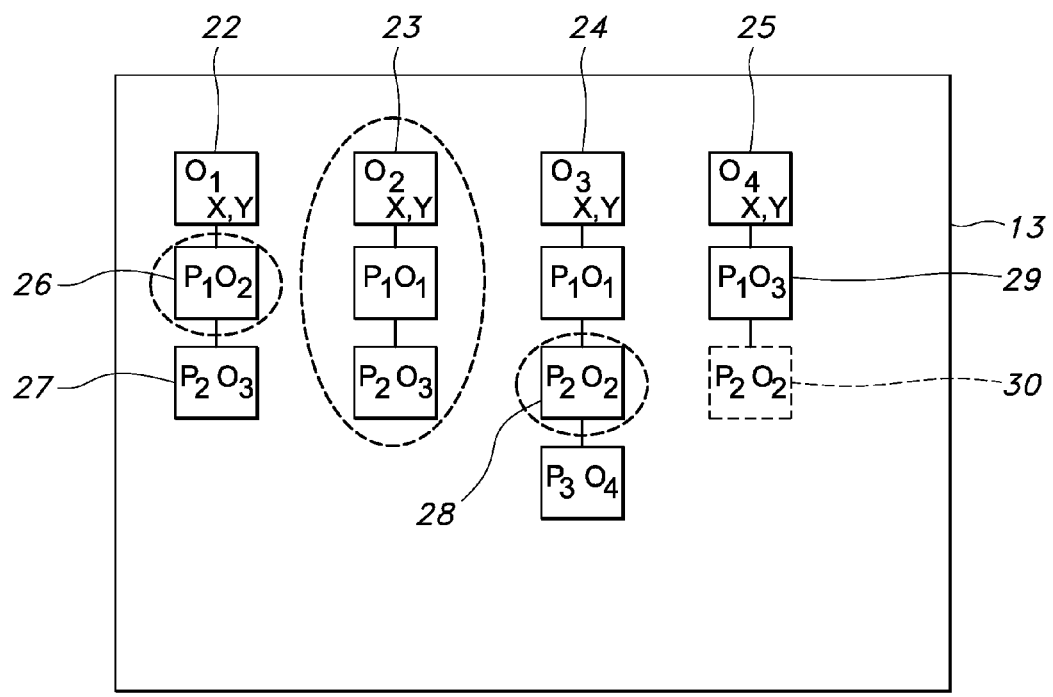
FIG. 3 illustrates the affects of an interpreted user initiated event on associated and unassociated objects and their respective pointers.

FIG. 3 provides a simple example of how the removal of one object from the content of a communication 10 affects associated objects and how the script inserted within the markup language interprets the user interactions, or editing of the communication, and reflows the amended communication to be redisplayed in the browser 11. As shown, communication 10 includes four objects $O_1, O_2, O_3$, and $O_4$ (indicated by numerals 22, 23, 24 and 25 respectively). For this example, objects 22, 23 and 24 are considered to be associated objects and object 25 is unassociated with at least object 23.

In accordance with the invention, the script inserted within the markup language defines each object of the plurality of user specific and non-user specific objects to include a pointer for each object associated therewith. In this example, objects 22, and 24 are associated with object 23. If object 23 is deleted from the communication, then script inserted within the markup language re-establishes the coordinates for each object associated with object 23. That is to say, the x, y coordinates for each of the objects 22 and 24 associated with the edited object 23 are re-established as the result of the interpreted user initiated event. These re-established coordinates are stored in memory as described above with regard to objects.

In addition, script inserted within the markup language also redefines the pointers for each object associated with the edited object 23 as the result of the interpreted user initiated event. In the example illustrated in FIG. 3, the deletion of object 23 may result in different coordinates for its associated objects 22 and 24, but not unassociated object 25. In the same manner, the deletion of object 23 may result in the need to redefine pointers $P_1$ and $P_2$ (indicated by numerals 26 and 27 respectively) of object 22. In this instance, pointer 26 which was associated with now deleted object 23 would itself be deleted and pointer 27 would remain unchanged. Similarly, pointer $P_2$ (indicated by numerals 28) of object 24 would be redefined and in fact deleted in this example. Also, while existing pointer $P_1$ (indicated by numeral 29) of originally unassociated object 25 would not be redefined, a new pointer $P_2$ (indicated by numeral 30) may be required to be defined in the event the interpreted user initiated event resulted in objects 22 or 23 being newly associated with object 25 due to proximity or otherwise.

Once the invisible client re-establishes coordinates and redefines the pointers as the result of the interpreted user initiated event, the remaining and/or altered content of the communication 10 must be reflowed and redrawn in the browser 11 as amended. This is accomplished by inserting script within the markup language for redrawing each object having re-established coordinates in the text area 13 or canvas as canvas natives visible in the browser. Additional objects which did not require their coordinates to be redefined as a result of the interpreted user initiated event may likewise be reflowed and redrawn in the browser.

As noted above, the non-user specific content may include a cursor, visual indicators, highlighting, underlining, and like items to be displayed in a text area 11 which mimic a word processing environment. The non-user specific content is defined as non-user specific objects. For example, a cursor object 31 has coordinates defined relative to the known origin of the text area 13 as shown in FIG. 1. The purpose of the cursor object 31 is to provide the user a visual indicator as to where a user initiated event may occur. In other words, the cursor object 31 acts in essentially the same manner a cursor is used in a typical word processing environment. As described above with regard to other objects, the cursor object 31 has pointers associated therewith and its coordinates may be re-established and its pointers redefined prior to the cursor object 31 being reflowed and redrawn in response to user initiated events.

Figure 4:
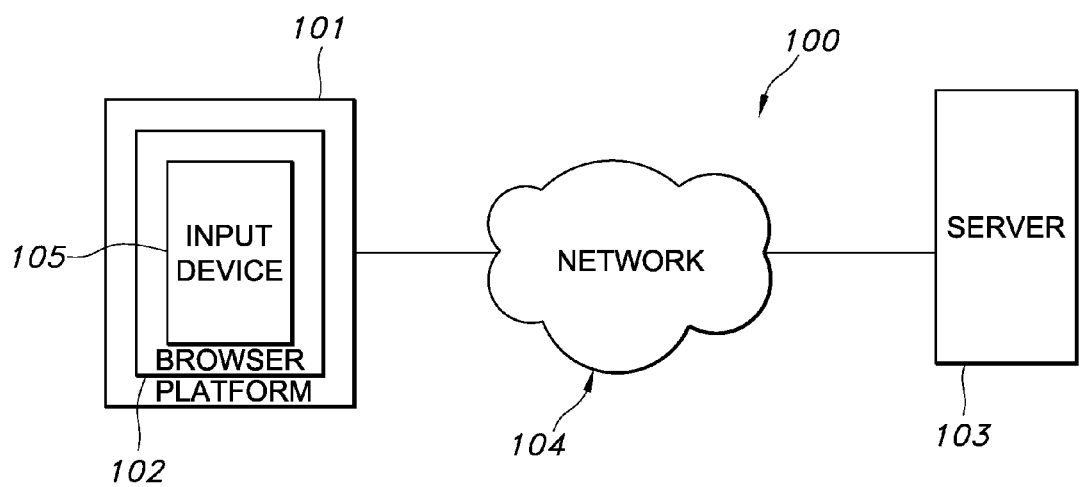
FIG. 4 is a block diagram of a representative client and server communication network over which the communication and data may be exchanged.

FIG. 4 is a block diagram of an exemplary communication system 100 through which an entity can create a communication and distribute that communication to a recipient or user. The system 100 may include a user device or platform 101 comprising a browser 102 that may be communicatively coupled to a server 103 over one or more networks 104. The platform 101 may include any computer, processor or other device on which a user may access a browser. The platform 101 may include, for example, a laptop computer, a smartphone, or mobile phone on which a user may view the communication using the browser 102. Examples of the embodiments for the platform 101, the server 103, and methods or any parts or function(s) thereof may be implemented using hardware, software modules, firmware, tangible computer readable or computer usable storage media having instructions stored thereon, or a combination thereof and may be implemented in one or more computer systems or other processing systems.

According to one embodiment, the browser 102 may include any device, application or module that enables a user or computer to navigate and/or retrieve data from another data source, typically over a network. The browser 102 may include, but is not limited to, any conventional web browser such as those that are widely available (e.g., Google® Chrome™ Safari®, Mozilla®, Firefox®, Internet Explorer™, Konqueror™, and Opera®). Older versions of Internet Explorer™, version 8 and earlier do not support canvas, however, Google® and Mozilla® plugins are available.

The browser 102 may include or otherwise be capable of rendering the text and images of a communication defined in a markup language including a plurality of elements and having a scripting language inserted therein. The browser 102 may be configured to render the communication onto a canvas element. In accordance with the broad teaching of the present invention, the browser 102 may be configured to use any number of protocols, known now or developed in the future, including protocols such as HTTP, FTP, and underlying protocols such as TCP/IP or UDP.

The browser 102 may further communicate with an input device 105, such as a touch screen or keyboard, to allow a user to initiate events such as input/edit data, input commands, or otherwise provide other control information to the browser. The browser 102 may request content from the server 103 based on the user input and the server may respond to a user request by providing content back to the browser and the platform 101 via the network 104. The browser 102 may also be configured to retrieve content from the server 103 without user prompting (e.g., the server may push and/or update data in the browser).

The network 104 may include any telecommunications or computer network that communicatively couples the platform 101 to the server 103. In one embodiment, the network 104 may include any type of data network or combination of data networks including, but not limited to, a local area network (LAN), a medium area network, or a wide area network such as the Internet. The network 104, for example, may be a wired or wireless network that allows the platform 101 and the server 103 to communicate with each other. The network 104 may further support world-wide-web protocols and services. The platform 101 may be a mobile phone or a tablet computer, for example, which is wirelessly connected to the Internet and the server through a service provider that maintains the network.

The server 103 may include a server that provides the communication, or a portion thereof, to the platform 101 over the network 104. The communication may be provided from the server 103 over the network 104 that connects the platform 101 to the Internet for example. The communication may be a website having one or more webpages, including a webpage as hosted by, or otherwise provided by the server 103. The server 103 may include one or more web servers, data servers and/or other servers that include information used to generate the communication. According to another embodiment, the server 103 may include a plurality of servers of a server farm or other network and/or service provider host(s). The server 103 may provide content such as web pages, apps, audio, video, etc., that may be retrieved or otherwise accessed by the platform 101 over the network 104. The content accessed by the platform 101 may be viewed, used, displayed or otherwise disseminated via the browser 102.

In another embodiment, the platform 101 and the server 103 may each be implemented on a computing device. Such a computing device may include, but is not limited to, a personal computer, mobile device such as a mobile phone or smartphone, a workstation, a tablet computer, an embedded system, a gaming console, a television, a set-top box, or any other computing device that can support a browser. Such a computing device may include, but is not limited to, a device having a processor and memory for executing and storing instructions. Such a computing device may include software, firmware, and/or hardware. The computing device may also have multiple processors and multiple shared or separate memory components. Software may include one or more applications and an operating system. Hardware can include, but is not limited to, a processor, memory and a graphical user interface display. An optional input device, such as a mouse, a keyboard, or a touch screen, may be used. According to another embodiment, the system functionality, as discussed above, may be performed at least in part on the platform 101 and/or the server 103, communicating over the network 104.

Figure 5:
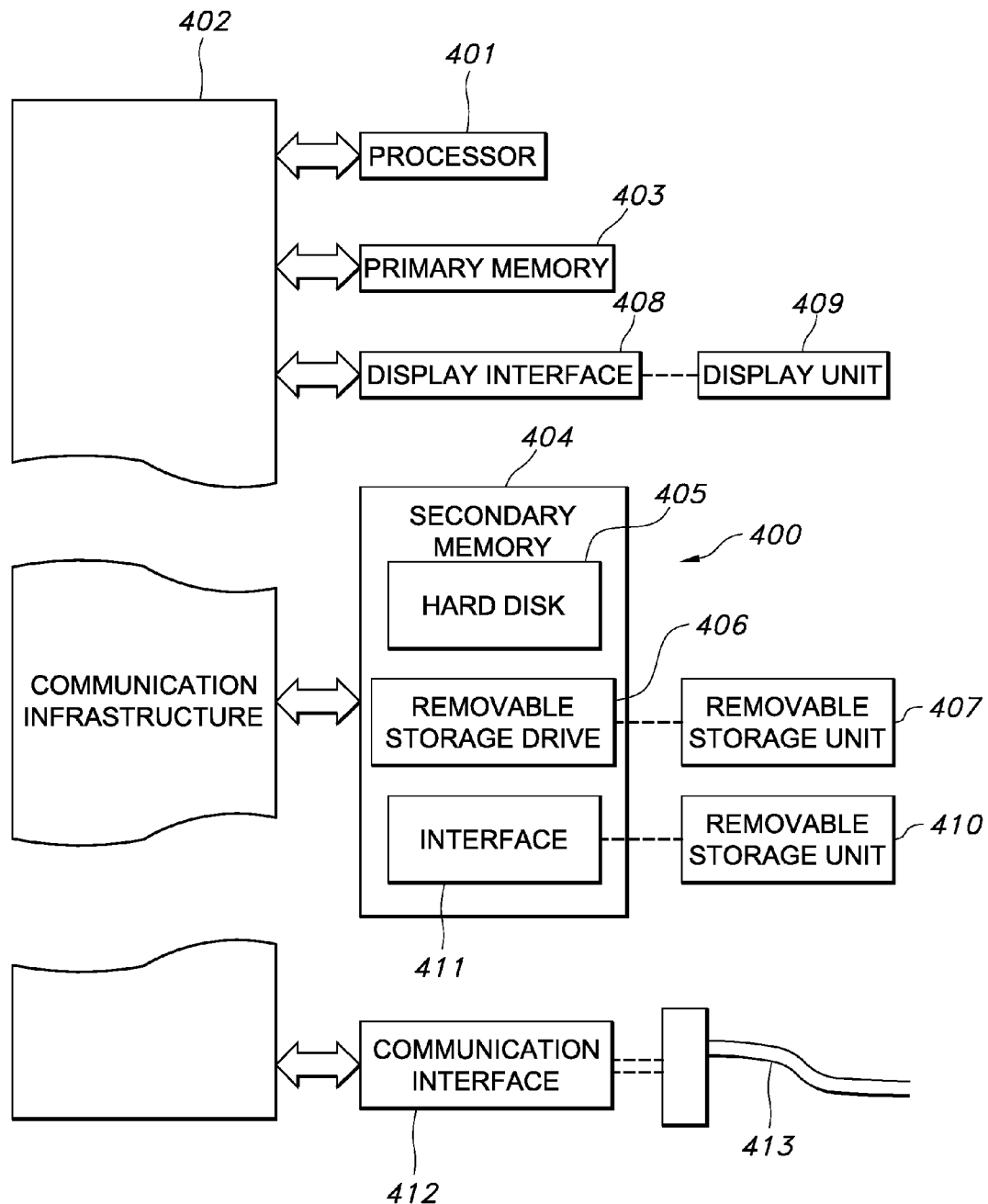
FIG. 5 is a flow diagram of a method of creating a communication including user specific content editable in a browser by a user independent of the user's platform or operating system.

FIG. 5 is a flow diagram of a method 200 for creating a communication including user specific content editable in a browser by a user independent of the user's platform or operating system. The method 200 includes the step 302 of defining a communication in markup language supported by the browser including a plurality of elements. The plurality of elements may include ubiquitous HTML 5 components with a fixed purpose and additional markup language elements as are known in the art. Each of these elements may be styled using CSS as is also know in the art.

At step 304, at least one canvas element is added as one of the plurality of elements. The canvas element, or canvas, is used to display the content of the communication in a text area 11 as shown in FIG. 1. The content may include both user specific content and non-user specific content including, for example, text, images, and other content, and a cursor, visual indicators, highlighting, underlining, and like items to be displayed in a text area 11 which mimic a word processing environment. To accomplish the drawing or display of the content, script is inserted within the markup language to control the generation and interaction with the content placed in the canvas or text area 13.

More specifically, as shown at steps 306, 308, and 310, script is inserted into the markup language of the communication for defining the user specific content as a plurality of user specific objects and the non-user specific content as a plurality of non-user specific objects, and establishing coordinates for each of the plurality of user specific objects and non-user specific objects relative a defined origin. As described with reference to FIG. 1, the defined origin may be that of a text area 13 which is itself defined as an object that includes the user specific objects and non-user specific objects.

At step 312, the script inserted into the markup language of the communication further draws each user specific object and non-user specific object at the coordinates established for the user specific object or non-user specific object in the at least one canvas element as canvas natives visible in the browser 11. An exemplary canvas or text area 13 displayed in a browser 11 is shown in FIG. 1. The exemplary text area 13 includes non-user specific objects such as radio buttons 12 and user specific objects such as the word "CAT" object 14.

At step 314, additional script is inserted into the markup language of the communication for interpreting user initiated events for use in editing at least one of the plurality of user specific objects and the plurality of non-user specific objects. In other words, when a user edits the content of the communication 10 in the browser 11, the user initiated events are interpreted by the script, or invisible client, and acted upon to effect the changes to the content that has been edited as the result of the interpreted user initiated event. Depending upon the editing performed by the user, portions of the plurality of user specific objects and the plurality of non-user specific objects may be redrawn in the at least one canvas element as canvas natives visible in the browser.

In one embodiment, the script inserted within the markup language may include script for further defining each of the plurality of user specific objects and non-user specific objects to include a pointer for each object associated therewith whether the associated object is a user or non-user specific object, script for re-establishing coordinates for each object of the plurality of user specific objects and non-user specific objects associated with an object that has been edited as the result of an interpreted user initiated event, script for redefining the pointer for each object of the plurality of user specific objects and non-user specific objects associated with an object that has been edited as the result of the interpreted user initiated event, and/or script for redrawing each object having re-established coordinates in the at least one canvas element as canvas natives visible in the browser. The inclusion of pointers with each of the plurality of objects is described in detail in association with FIG. 3 above and may include information pointers as described therein.

When a user initiated event occurs, the script, or invisible client, re-establishes the coordinates and redefines the pointers for each object of the plurality of user specific objects and non-user specific objects associated with an object that has been edited as the result of an interpreted user initiated event. The objects having re-established coordinates are then redrawn in the at least one canvas element as canvas natives visible in the browser. In other words, the portion or portions of the content visible in the browser 11 affected by the interpreted user initiated event are reflowed and redrawn in order to display the content as edited.

The plurality of non-user specific objects in the computer-implemented method may include a cursor object having coordinates relative to the defined origin, and the plurality of elements defining the communication in markup language supported by the browser may be styled using cascading style sheets. The script inserted within the markup language may also include script for formatting the drawing commands in accordance with the cascading style sheets used to style the plurality of elements.

Figure 6:
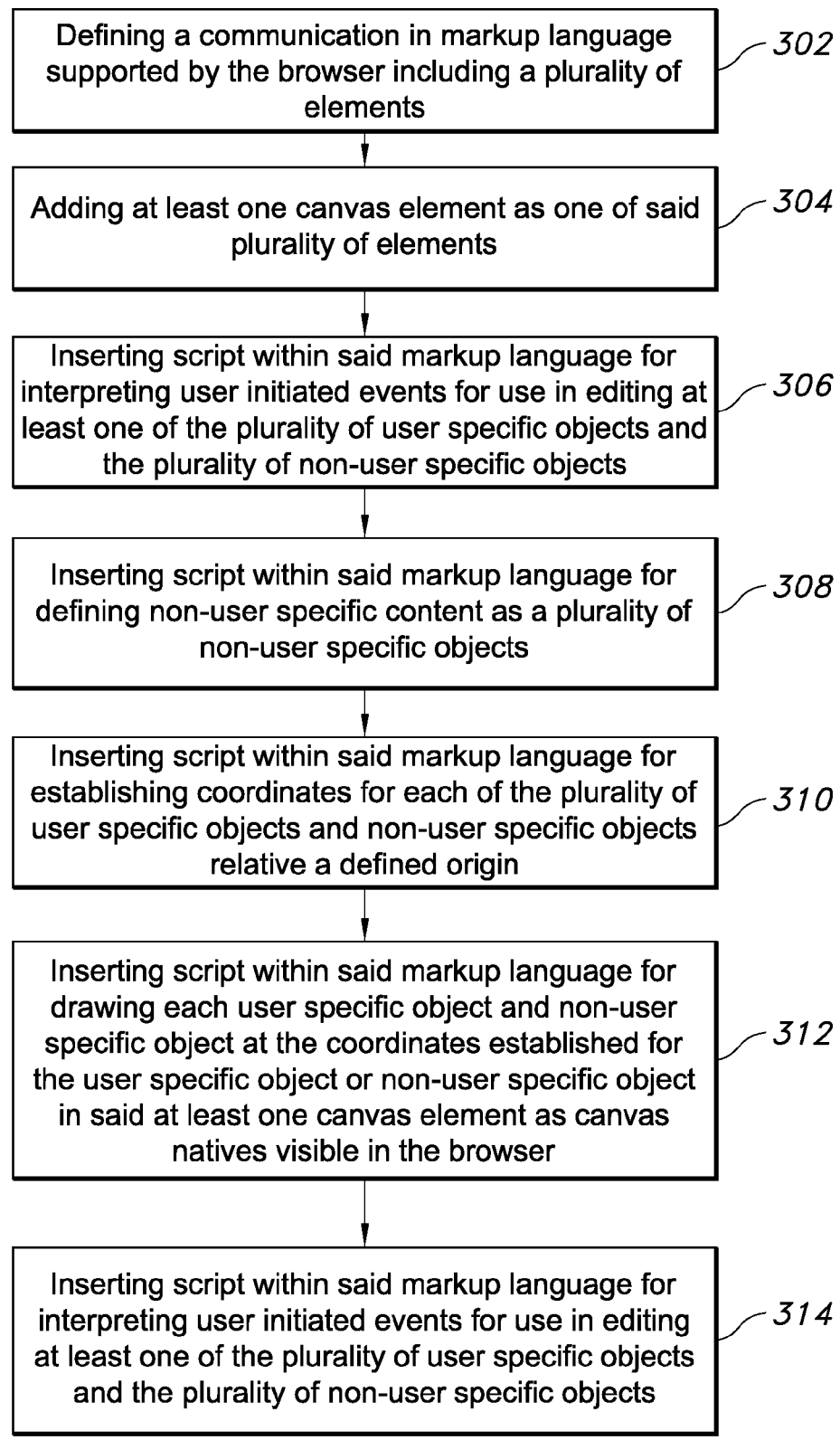
FIG. 6 is a block diagram of a representative system that could be used to embody or implement embodiments, or portions thereof, of the present invention described herein.

FIG. 6 is an example system 400 diagram of the invention that can be used to embody or implement embodiments, or portions thereof, as described herein. For example, the platform 101 and/or server 103 may be implemented in a computer system 400, or another system similar thereto, using hardware, software, firmware, tangible computer readable media having instructions stored thereon, or a combination thereof and may be implemented in one or more computer systems or other processing systems. Hardware, software, or any combination of such may embody any of the modules, procedures, and components in FIGS. 1-5.

If programmable logic is used, such logic may execute on a commercially available processing platform or a special purpose device. One of ordinary skill in the art would appreciate that embodiments of the disclosed subject matter can be practiced with various computer system configurations, including for example, multi-core multiprocessor systems, minicomputers, mainframe computers, computers linked or clustered with distributed functions, as well as pervasive or miniature computers that may be embedded into virtually any device.

A computing device having at least one processor device and a memory, for example, may be used to implement the above-described embodiments. A processor device may be a single processor, a plurality of processors, or combinations thereof. Processor devices may have one or more processor cores as well.

Various embodiments of the invention are described in terms of this example computer system. After reading this description, it will become apparent to a person skilled in the relevant art how to implement the invention using other computer systems and/or computing architectures. Although operations may be described as a sequential process, some of the operations may in fact be performed in parallel, concurrently, and/or in a distributed environment, and with program code stored locally or remotely for access by single or multiprocessor machines. In addition, in some embodiments, the order of operations may be rearranged without departing from the spirit of the disclosed subject matter.

A processor device 401 may be a special purpose or a general-purpose processor device. As will be appreciated by persons skilled in the relevant art, the processor device 401 may also be a single processor in a multi-core/multiprocessor system, such system operating alone, or in a cluster of computing devices operating in a cluster or server farm. Processor device 401 is connected to a communication infrastructure 402, such as, a network, bus, message queue, or multi-core message-passing scheme.

Computer system 400 also includes a primary memory, for example, random access memory (RAM), and may also include a secondary memory 404. Secondary memory 404 may include, for example, a hard disk drive 405, a removable storage drive 406, or other like memory devices. Removable storage drive 406 may comprise a floppy disk drive, a magnetic tape drive, a flash memory, an optical disk drive, or the like. The removable storage drive 406 reads from and/or writes to a removable storage unit as is known in the art. Removable storage unit 407 may likewise comprise a floppy disk, magnetic tape, flash memory, or the like which is read by and written to by removable storage drive 406. As will be appreciated by persons skilled in the relevant art, removable storage unit 405 includes a computer usable storage medium having stored therein computer software and/or data.

Computer system 400 may also include a display interface 408 that forwards graphics, text, and other data from communication infrastructure 402 for display on display unit 409. The display interface 408 may include input and output devices such as keyboards and mice, or the like (not shown).

In alternative implementations, secondary memory 404 may include other similar memory devices for allowing computer programs or other instructions to be loaded into the computer system 400. Such devices may include, for example, a removable storage unit 410 and an interface 411, a program cartridge and cartridge interface, removable memory chips, such as EPROMs or PROMs, and associated socket, and/or other removable storage units and interfaces which allow software and data to be transferred from the removable storage unit 407 to the computer system 400.

The computer system 400 may also include a communications interface 412. Communications interface 412 allows software and data to be transferred between computer system 400 and external devices, and may include a modem, a network interface (e.g., an Ethernet card), a communications port, a PCMCIA slot and card, or other like interfaces. Software and data transferred via communications interface 412 may be in the form of signals S, which may be electronic, electromagnetic, optical, or other signals capable of being received by communications interface. These signals S may be provided to a communications interface 412 via a communications path 413. Communications path 413 carries signals S and may be implemented using wire or cable, phone lines, cellular phone links, fiber optics, an RF link, or other communication channels.

In this document, the terms "computer program medium" and "computer usable medium" are used to generally refer to media such as the removable storage units 407 and/or 410, and a hard disk installed in hard disk drive 405. Computer program medium and computer usable medium may also refer to memories, such as the primary memory 403 and the secondary memory 404.

Computer programs are stored in the primary memory 403 and/or secondary memory 404. Computer programs may also be received via a communications interface. Such computer programs, when executed, enable the computer system to implement the present invention as discussed herein. In particular, the computer programs, when executed, enable the processor device 401 to implement the processes of the invention, such as the stages in the method illustrated by the flowchart in FIG. 5. Accordingly, such computer programs represent controllers of the computer system 400. Where the invention is implemented using software, the software may be stored in a computer program product and loaded into computer system 400 using removable storage drive 406, interface 411, and hard disk drive 405, or communication interface 412.

Embodiments of the invention also may be directed to computer program products comprising software stored on any computer useable medium. Such software, when executed in one or more data processing device(s), causes a data processing device(s) to operate as described herein. Embodiments of the invention employ any computer useable or readable medium. Examples of computer useable mediums include, but are not limited to, primary storage devices (e.g., any type of random access memory) and secondary storage devices (e.g., hard drives, floppy disks, CD ROMS, disks, tapes, magnetic storage devices, and optical storage devices, MEMS, nanotechnological storage devices, and the like).

The breadth and scope of the present invention should not be limited by any of the above-described exemplary embodiments, but should be defined only in accordance with the following claims and their equivalents. Ultimately, skilled artisans should recognize at least the following advantages. Namely, they should appreciate that the foregoing supports the creation and editing of a communication including user specific content editable in a browser by a user independent of the user's platform or operating system. Naturally, any improvements along such lines should contemplate good engineering practices, such as simplicity, ease of implementation, unobtrusiveness, stability, etc.

The foregoing has been described in terms of specific embodiments, but one of ordinary skill in the art will recognize that additional embodiments are possible without departing from its teachings. This detailed description, therefore, and particularly the specific details of the exemplary embodiments disclosed, is given primarily for clarity of understanding, and no unnecessary limitations are to be implied. Modifications will become evident to those skilled in the art upon reading this disclosure and may be made without departing from the spirit or scope of the invention. Relatively apparent modifications, of course, include combining the various features of one or more figures with the features of one or more of the other figures.

The invention claimed is:

1. In a computing system environment, a method of creating a communication including user specific content editable in a browser by a user independent of the user's platform or operating system, comprising:
   defining a communication in markup language supported by the browser including a plurality of elements;
   adding at least one canvas element as one of said plurality of elements; and
   inserting script within said markup language for (1) defining the user specific content as a plurality of user specific objects, (2) defining non-user specific content as a plurality of non-user specific objects, (3) establishing coordinates for each of the plurality of user specific objects and non-user specific objects relative a defined origin, (4) drawing each user specific object and non-user specific object at the coordinates established for the user specific object or non-user specific object in said at least one canvas element as canvas natives visible in the browser, and (5) interpreting user initiated events for use in editing at least one of the plurality of user specific objects and the plurality of non-user specific objects;
   wherein the plurality of elements defining the communication in markup language supported by the browser are styled using cascading style sheets, and wherein the step of inserting script within said markup language includes script for formatting the drawing commands in accordance with the cascading style sheets used to style the plurality of elements.

2. The method of claim 1, wherein the step of inserting script within said markup language includes script for further defining each of the plurality of user specific objects and non-user specific objects to include at least one pointer for each object associated therewith whether the associated object is a user or non-user specific object.

3. The method of claim 2, wherein the step of inserting script within said markup language includes script for further defining each of the plurality of user specific objects and non-user specific objects to include at least one informational pointer.

4. The method of claim 2, wherein the step of inserting script within said markup language includes script for re-establishing coordinates for each object of the plurality of user specific objects and non-user specific objects associated with an object that has been edited as the result of an interpreted user initiated event.

5. The method of claim 4, wherein the step of inserting script within said markup language includes script for redefining the at least one pointer for each object of the plurality of user specific objects and non-user specific objects associated with an object that has been edited as the result of the interpreted user initiated event.

6. The method of claim 5, wherein the step of inserting script within said markup language includes script for redrawing each object having re-established coordinates in said at least one canvas element as canvas natives visible in the browser.

7. The method of claim 1, wherein the plurality of non-user specific objects includes a cursor object having coordinates relative to the defined origin.

8. The method of claim 7, wherein the step of inserting script within said markup language includes script for further defining each of the plurality of user specific objects and non-user specific objects to include at least one pointer for each object associated therewith whether the associated object is a user or non-user specific object, and
   wherein the step of inserting script within said markup language includes script for re-establishing coordinates for each object of the plurality of user specific objects and non-user specific objects associated with an object that has been edited as the result of an interpreted user initiated event.

9. The method of claim 8, wherein the step of inserting script within said markup language includes script for further defining each of the plurality of user specific objects and non-user specific objects to include at least one informational pointer.

10. The method of claim 8, wherein the step of inserting script within said markup language includes script for redefining the at least one pointer for each object of the plurality of user specific objects and non-user specific objects associated with an object that has been edited as the result of the interpreted user initiated event.

11. The method of claim 10, wherein the step of inserting script within said markup language includes script for redrawing each object having re-established coordinates in said at least one canvas element as canvas natives visible in the browser.

12. A non-transitory computer storage medium encoded with a computer program, the program comprising instructions that when executed by one or more computers cause the one or more computers to perform operations comprising:
   defining a communication, including user specific content editable in a browser by a user independent of the user's platform or operating system, in markup language supported by the browser including a plurality of elements;
   adding at least one canvas element as one of said plurality of elements; and
   inserting script within said markup language for (1) defining the user specific content as a plurality of user specific objects, (2) defining non-user specific content as a plurality of non-user specific objects, (3) establishing coordinates for each of the plurality of user specific objects and non-user specific objects relative a defined origin, (4) drawing each user specific object and non-user specific object at the coordinates established for the user specific object or non-user specific object in said at least one canvas element as canvas natives visible in the browser, and (5) interpreting user initiated events for use in editing at least one of the plurality of user specific objects and the plurality of non-user specific objects,
   wherein the plurality of elements defining the communication in markup language supported by the browser are styled using cascading style sheets, and wherein the operation of inserting script within said markup language includes script for formatting the drawing commands in accordance with the cascading style sheets used to style the plurality of elements.

13. The non-transitory computer storage medium of claim 12, wherein the operation of inserting script within said markup language includes script for further defining each of the plurality of user specific objects and non-user specific objects to include at least one pointer for each object associated therewith whether the associated object is a user or non-user specific object.

14. The non-transitory computer storage medium of claim 13, wherein the operation of inserting script within said markup language includes script for further defining each of the plurality of user specific objects and non-user specific objects to include at least one informational pointer.

15. The non-transitory computer storage medium of claim 13, wherein the operation of inserting script within said markup language includes script for re-establishing coordinates for each object of the plurality of user specific objects and non-user specific objects associated with an object that has been edited as the result of an interpreted user initiated event.

16. The non-transitory computer storage medium of claim 15, wherein the operation of inserting script within said markup language includes script for redefining the at least one pointer for each object of the plurality of user specific objects and non-user specific objects associated with an object that has been edited as the result of the interpreted user initiated event.

17. The non-transitory computer storage medium of claim 16, wherein the operation of inserting script within said markup language includes script for redrawing each object having re-established coordinates in said at least one canvas element as canvas natives visible in the browser.

18. The non-transitory computer storage medium of claim 12, wherein the plurality of non-user specific objects includes a cursor object having coordinates relative to the defined origin.

19. The non-transitory computer storage medium of claim 18, wherein the operation of inserting script within said markup language includes script for further defining each of the plurality of user specific objects and non-user specific objects to include at least one pointer for each object associated therewith whether the associated object is a user or non-user specific object, and
wherein the operation of inserting script within said markup language includes script for re-establishing coordinates for each object of the plurality of user specific objects and non-user specific objects associated with an object that has been edited as the result of an interpreted user initiated event.

20. The non-transitory computer storage medium of claim 19, wherein the operation of inserting script within said markup language includes script for redefining the at least one pointer for each object of the plurality of user specific objects and non-user specific objects associated with an object that has been edited as the result of the interpreted user initiated event.

21. The non-transitory computer storage medium of claim 20, wherein the operation of inserting script within said markup language includes script for redrawing each object having re-established coordinates in said at least one canvas element as canvas natives visible in the browser.

22. A system comprising:
one or more computers; and
a computer-readable medium coupled to the one or more computers having instructions stored thereon which, when executed by the one or more computers, cause the one or more computers to perform operations comprising:
defining a communication, including user specific content editable in a browser by a user independent of the user's platform or operating system, in markup language supported by the browser including a plurality of elements;
adding at least one canvas element as one of said plurality of elements; and
inserting script within said markup language for (1) defining the user specific content as a plurality of user specific objects, (2) defining non-user specific content as a plurality of non-user specific objects, (3) establishing coordinates for each of the plurality of user specific objects and non-user specific objects relative a defined origin, (4) drawing each user specific object and non-user specific object at the coordinates established for the user specific object or non-user specific object in said at least one canvas element as canvas natives visible in the browser, and (5) interpreting user initiated events for use in editing at least one of the plurality of user specific objects and the plurality of non-user specific objects,
wherein the plurality of elements defining the communication in markup language supported by the browser are styled using cascading style sheets, and wherein the operation of inserting script within said markup language further comprises inserting script for formatting the drawing commands in accordance with the cascading style sheets used to style the plurality of elements.

23. The system of claim 22, wherein the operation of inserting script within said markup language further comprises inserting script for further defining each of the plurality of user specific objects and non-user specific objects to include at least one pointer for each object associated therewith whether the associated object is a user or non-user specific object.

24. The system of claim 23, wherein the operation of inserting script within said markup language includes script for further defining each of the plurality of user specific objects and non-user specific objects to include at least one informational pointer.

25. The system of claim 23, wherein the operation of inserting script within said markup language further comprises inserting script for re-establishing coordinates for each object of the plurality of user specific objects and non-user specific objects associated with an object that has been edited as the result of an interpreted user initiated event.

26. The system of claim 25, wherein the operation of inserting script within said markup language further comprises inserting script for redefining the at least one pointer for each object of the plurality of user specific objects and non-user specific objects associated with an object that has been edited as the result of the interpreted user initiated event.

27. The system of claim 26, wherein the operation of inserting script within said markup language further comprises inserting script for redrawing each object having re-established coordinates in said at least one canvas element as canvas natives visible in the browser.

28. The system of claim 22, wherein the plurality of non-user specific objects includes a cursor object having coordinates relative to the defined origin.

29. The system of claim 28, wherein the operation of inserting script within said markup language further comprises inserting script for further defining each of the plurality of user specific objects and non-user specific objects to include at least one pointer for each object associated therewith whether the associated object is a user or non-user specific object, and for re-establishing coordinates for each object of the plurality of user specific objects and non-user specific objects associated with an object that has been edited as the result of an interpreted user initiated event.

30. The system of claim 29, wherein the operation of inserting script within said markup language further comprises inserting script for redefining the at least one pointer for each object of the plurality of user specific objects and non-user specific objects associated with an object that has been edited as the result of the interpreted user initiated event.

31. The system of claim 30, wherein the operation of inserting script within said markup language further comprises inserting script for redrawing each object having re-established coordinates in said at least one canvas element as canvas natives visible in the browser.

* * * * *